United States Patent

[11] 3,593,039

[72] Inventors Carl Ingvar Boksjo
    Ludvika;
    Per Gustav Johannes Svedberg, Vallingby,
    both of Sweden
[21] Appl. No. 683,521
[22] Filed Nov. 16, 1967
[45] Patented July 13, 1971
[73] Assignee Allmanna Svenska Elektriska Aktiebolaget
    Vasteras, Sweden
[32] Priority Nov. 16, 1966
[33] Sweden
[31] 15,688

[54] CIRCUIT ARRANGEMENT FOR REDUCING
    ELECTRIC STRAINS IN THYRISTOR TYPE
    STATIC CURRENT CONVERTERS
    7 Claims, 1 Drawing Fig.
[52] U.S. Cl. .................................................... 307/252,
                                                307/301, 315/190
[51] Int. Cl. ...................................................... H03k 17/00
[50] Field of Search ........................................... 307/252,
    303, 301, 284; 315/189, 252, 190, 185, 194, 195,
                                    204, 193; 317/33; 321/11

[56] References Cited
    UNITED STATES PATENTS
2,901,695  8/1959  Weed ............................. 315/190
3,267,290  8/1966  Diebold ......................... 307/252
3,293,449 12/1966  Gutzwiller ..................... 307/301
3,355,600 11/1967  Mapham ........................ 307/252
3,386,027  5/1968  Kilgore et al. ................. 307/252

Primary Examiner—John S. Heyman
Assistant Examiner—R. E. Hart
Attorney—Jennings Bailey, Jr.

ABSTRACT: In a high tension thyristor current converter comprising a plurality of similarly designed sections in series with each other, each section including at least one main thyristor, a voltage divider and a control device, each such section is shunted by an auxiliary thyristor circuit dimensioned in such a way that the electric strains at the time of switching on and off the thyristors are reduced. In this case it is possible to delay the ignition or the main thyristor with respect to the ignition of the auxiliary thyristor, until the voltage across the main thyristor has declined to a value not endangering the ignition of said thyristor, and/or to delay the extinction of the auxiliary thyristor relative to the extinction of the main thyristor, so that the recovery time of the main thyristor will be determined by said auxiliary thyristor.

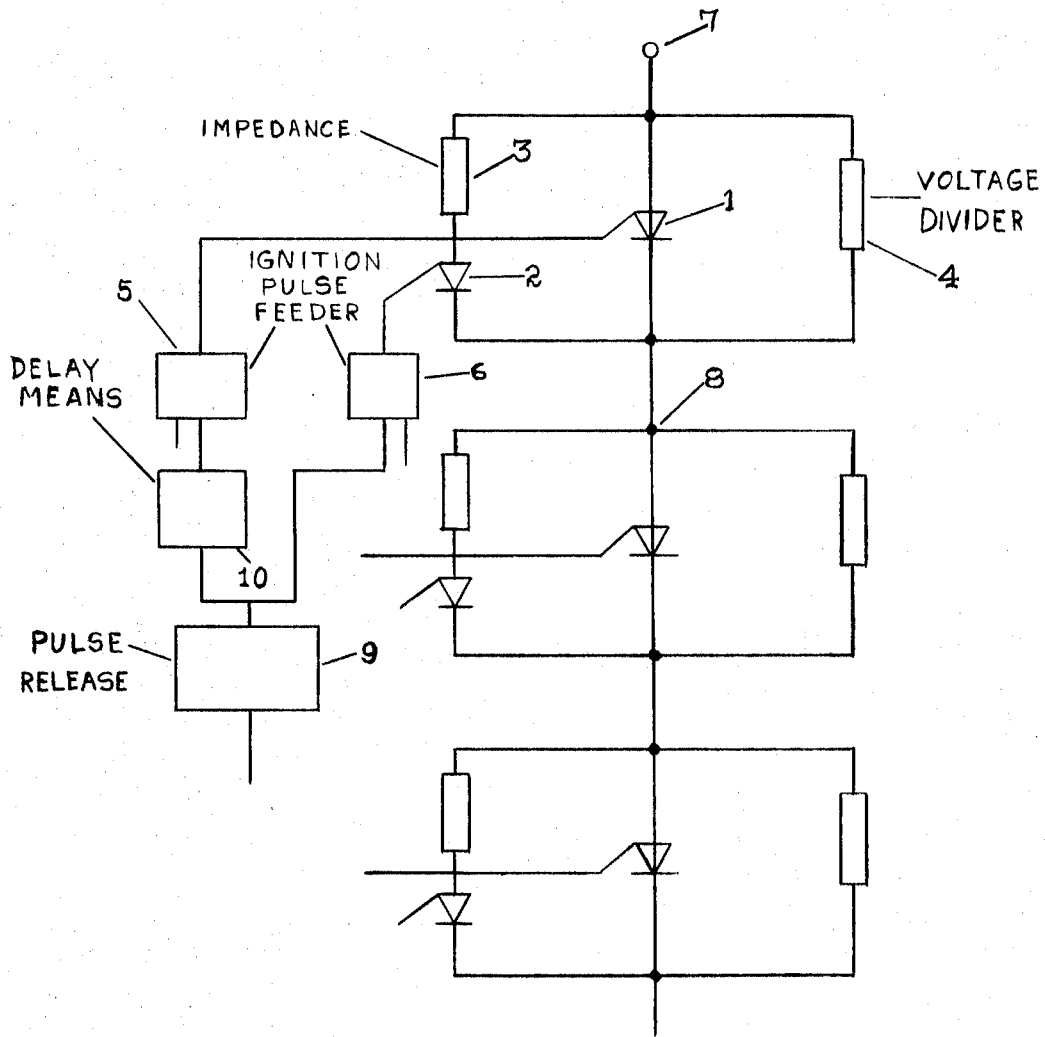

CIRCUIT ARRANGEMENT FOR REDUCING ELECTRIC STRAINS IN THYRISTOR TYPE STATIC CURRENT CONVERTERS

FIELD OF THE INVENTION

The present invention relates to a method for reducing the strains arising when switching on and/or off the current in a thyristor type static current converter, comprising several sections connected in series, whereof each section includes one or several main thyristors connected in parallel, a voltage divider and at least one control device. The invention also relates to a circuit arrangement to accomplish said method.

BACKGROUND OF THE INVENTION

1. The Prior Art

In high tension thyristor type current converters the thyristors are subjected to large electric strains during the switching on and off operations. Efforts have therefore been made to reduce such strains. From the technical field of gas filled rectifiers it is known to connect in parallel a main valve chain and an auxiliary valve chain possibly in series with a large impedance, the auxiliary valve chain being turned on first and thereafter the main valve chain, which then takes over the current.

2. Summary of the Invention

The same principle can also be employed in thyristor type static converter valves, but the method according to the invention differs from said principle as will be described in the following disclosure. According to the invention each section is provided with an auxiliary thyristor circuit connected in parallel therewith, the thyristor or the circuit being dimensioned such that the strains in the auxiliary thyristor will not be of dangerous proportions, during a change of state of the converter, that is, when being ignited, and that the excitation of the main thyristor or thyristors is delayed relative to the excitation of the auxiliary thyristor, until the voltage over the main thyristor(s) has declined to a value not endangering the excitation of said thyristor(s) and/or the turning off of the auxiliary thyristor is delayed relative to the turning off of the main thyristor(s), so that the recovery time of said main thyristor(s) will be determined by the auxiliary thyristor, and moreover the auxiliary thyristor circuit is arranged such that after excitation of the main thyristor(s) the current flow through the auxiliary thyristor will be of small proportions relative to the current flow through the main thyristor(s). This method involves the realization of at least two conditions, namely on one hand that the strains on the auxiliary thyristor have to be so low that the thyristor can stand said strain, and on the other hand that the load current has to be taken over by the main thyristor after the auxiliary thyristor has been turned on. The first condition can be fulfilled by introducing various series impedances in the auxiliary thyristor circuit or by choosing thyristors specially resistant to ignition strains. Such high resistivity to ignition strains means that the thyristor has the capacity to carry high current during the interval immediately following upon the initiation of the ignition operation without being destroyed. This can among other things be achieved by proper selection of material for the thyristor or by suitable design of the thyristor or its excitation circuits. The second one of the two conditions mentioned can be realized either by means of the series impedance mentioned or by choosing an auxiliary thyristor of a high conduction voltage drop relative to the main thyristor. The auxiliary thyristor by its higher conduction voltage drop can be given such qualities that its recovery time, when turned off, will be shorter than the corresponding time for the main thyristor. If one provides for a later extinction of the auxiliary thyristors relative to the main thyristors, the recovery time of the system will substantially be determined by the recovery time of the auxiliary thyristors and not by the main thyristors. In this case the same circuit having a series impedance for each auxiliary thyristor can be employed for the purpose of obtaining a delayed turning off, if said impedance is an inductance. As an alternative or supplementary arrangement the auxiliary thyristors can be made to ignite by a special release pulse during the commutating or extinction interval of the main thyristors.

Upon the ignition of the auxiliary thyristor the strains on the same are substantially determined by the differential time coefficient and amplitude of the current during the first microseconds. A suitable circuit arrangement, when putting into practice the method according to the invention, therefore conveniently includes an impedance connected in series with each auxiliary thyristor in order to keep the differential coefficient and the amplitude within tolerable limits. This series impedance can comprise a resistance, an inductance or an inductance damped by a series or parallel resistance. The inductance can possibly be designed as a reactor having an iron core, which is saturated at a certain current level. Each main thyristor has to be turned on only after the voltage divider belonging to each main thyristor and usually comprising a resistance in series with a capacitor has been discharged to such an extent and the voltage thereby having had time to decline to such a value that the differential current coefficient and the current amplitude during the ignition phase of the main thyristor will have acquired a safe value.

BRIEF DESCRIPTION OF THE DRAWING

The invention is described more in detail below with reference to the accompanying drawing, which illustrates the method according to the invention and shows a circuit diagram of the arrangement for the accomplishment of said method.

DESCRIPTION OF THE PREFERRED EMBODIMENTS

The drawing illustrates several sections of a high voltage thyristor type static current converter, which in consideration of the operating voltage comprises a number of similarly designed sections in series with each other, including a main thyristor means comprising a main thyristor in order to obtain the required current carrying capacity. A terminal 7 of the arrangement may then be connected to one of the poles of a high voltage AC source, while a terminal 8 of the first section is connected to the subsequent section of the current converter in the chain of series connected sections. In the first section as well as in each one of the sections connected in series to said first section each main thyristor 1 is shunted by a voltage divider element 4 and an auxiliary thyristor means comprising a thyristor 2 in series with an impedance 3. In the circuit arrangement a channel 5 also is included for the purpose of feeding current pulses to main thyristor 1, and a channel 6 for feeding current pulses to auxiliary thyristor 2. Channels 5 and 6 may include control devices for thyristors 1 and 2 respectively, to which devices releasing pulses are fed from pulse release 9 for the release of ignition pulses. From what is disclosed above it is evident that the ignition pulses in channel 5 to the main thyristor 1 have to be delayed in relation to the ignition pulses in channel 6 to the auxiliary thyristor 2. If channel 5 for the main thyristor comprises a control device for the same, this delayed action of the ignition pulses to the main thyristor 1 also can be obtained by means 10 of delaying means of known type, said means being inserted between channel 6 and control device 5. In this case the ignition pulses are fed only through channel 6 in order to first turn on the auxiliary thyristor 2 and simultaneously fed to the delaying means for transmission with a suitable delay to control device 5 for its release, so that the main thyristor will turn on later than the auxiliary thyristor. The delaying means can also supply the delayed ignition pulse directly to the control electrode of the main thyristor.

Instead of the delaying means used in the two alternative arrangements described above, the arrangement may comprise a blocking device having the purpose of sensing the voltage over the main thyristor and blocking the ignition of said thyristor, until the voltage over the main thyristor has declined to a safe value.

In order to ensure that the strains on auxiliary thyristor 2 will be kept within safe limits for said thyristor, so that it will resist said strains, the circuit includes the series impedance 3. Said impedance may comprise a mere inductance, which by way of example is shunted by a resistance for damping of transient phenomena or oscillations, or may be connected in series with a resistance for damping and reducing the load on auxiliary thyristor 2 after the ignition of thyristor 1. The impedance 3 may also be a variable inductance designed as a reactor having an iron core, which is saturated at a certain current level. Further the series impedance may entirely or partly be made up by the impedance of the auxiliary thyristor itself. As a general rule the series impedance has to be dimensioned such that the current by the action of the auxiliary thyristor during the ignition phase of said auxiliary thyristor will be limited to a safe value for the thyristor, and after the turning on of the main thyristor that said current will be small in relation to the current through the main thyristor. This current distribution can, according to the above alternative, be obtained by choosing of an auxiliary thyristor having a high conducting voltage drop as compared with the main thyristor.

In order to reduce the strains during the extinction operation the same arrangement as the one illustrated can be used in order to reduce the recovery time of the system, the series impedance 3 then being an inductance for providing delayed extinction of auxiliary thyristor 2.

What we claim is:

1. A thyristor type static current converter comprising a plurality of sections connected in series, and having, for the purpose of reducing strains during a change of state of the converter, in each section a main thyristor means, an auxiliary thyristor means and a voltage divider element connected in parallel, said auxiliary thyristor means being so dimensioned that the strains in the auxiliary thyristor will have safe proportions when the thyristor thereof is ignited, means to ignite said main thyristor means independently of said auxiliary thyristor means, said section having means operatively associated therewith to cause the ignition periods of the two thyristors to overlap only in part, and having means to maintain the current in the auxiliary thyristor means small in relation to the current through the main thyristor means when the thyristor thereof is ignited.

2. A converter as claimed in claim 1 in which the means for causing the ignition periods to overlap only in part comprises means for feeding control pulses to both thyristor means and means to delay the pulses to the thyristor of the main thyristor means so as to delay the ignition thereof in relation to the ignition of the auxiliary thyristor means during ignition of the converter until the voltage over the main thyristor means has declined to a safe value for the ignition thereof.

3. A converter as claimed in claim 2 in which the control pulse feeding means comprises a common ignition pulse supplying channel for the (main and auxiliary) thyristors and a delaying device between said channel and the control device (or devices) for the thyristor of the main thyristor means.

4. A converter as claimed in claim 1, characterized by the auxiliary thyristor means having an impedance connected in series to the said auxiliary thyristor means.

5. A converter as claimed in claim 1, characterized by the thyristor of the auxiliary thyristor means being of high conduction voltage drop in relation to the thyristor of the main thyristor means.

6. A converter as claimed in claim 1, in which the means for causing the ignition periods to overlap only in part comprises means to delay the extinction of the auxiliary thyristor means in relation to the extinction of main thyristor means so that the recovery time of the main thyristor means during extinction of the converter will be determined by the auxiliary thyristor means.

7. A converter as claimed in claim 6, characterized in that the auxiliary thyristor means includes an impedance connected in series with the thyristor.